US012766847B2

(12) United States Patent
Franck

(10) Patent No.: US 12,766,847 B2
(45) Date of Patent: Oct. 20, 2026

(54) DEVICE AND METHOD FOR CLEANING AND/OR OPERATING AN INK-JET PRINTER HEAD EQUIPPED WITH AN UPSTREAM PRESSURE ABSORBER

(71) Applicant: Jan Franck, Weidenberg (DE)

(72) Inventor: Jan Franck, Weidenberg (DE)

( * ) Notice: Subject to any disclaimer, the term of this patent is extended or adjusted under 35 U.S.C. 154(b) by 322 days.

(21) Appl. No.: 17/588,672

(22) Filed: Jan. 31, 2022

(65) Prior Publication Data

US 2022/0153033 A1 May 19, 2022

Related U.S. Application Data

(63) Continuation-in-part of application No. 16/707,193, filed as application No. PCT/IB2018/000616 on Jun. 11, 2018, now abandoned.

(30) Foreign Application Priority Data

Jun. 9, 2017 (DE) ........................ 20 2017 003 026

(51) Int. Cl.
*B41J 2/175* (2006.01)

(52) U.S. Cl.
CPC ................................ *B41J 2/17596* (2013.01)

(58) Field of Classification Search
CPC .................................................. B41J 2/17596
See application file for complete search history.

(56) References Cited

U.S. PATENT DOCUMENTS 4,475,116 A 10/1984 Sicking et al.
2003/0146958 A1 8/2003 Aruga et al.

(Continued)

FOREIGN PATENT DOCUMENTS

DE 2224590 12/1972
DE 3525810 1/1987
DE 69006521 3/1994

*Primary Examiner* — Shelby L Fidler
(74) *Attorney, Agent, or Firm* — Pandiscio & Pandiscio

(57) ABSTRACT

An apparatus (1) for providing an ink or ink-jet printer head with ink, the apparatus being equipped with: —an upstream pressure absorber (2), with the pressure absorber (2) comprising a closed damper chamber (4) that is at least partially limited by a plain damper film (3) made of a flexible material so that it reacts to a pressure difference (Δp) between both areas of the film with a curved deformation; —a refill valve (5) arranged in the damper chamber (4) for refilling the damper chamber (4) with ink in a printing mode of operation as a response to a curved deformation of the damper film (3) into the damper chamber (4); and —a controllable device (6) arranged outside of the damper chamber (4) for exerting an external pressure (pc) on at least one area of the damper film (3) limiting the damper chamber (4), the controllable device (6) comprising a control chamber (36) having: —a housing (31) consisting of rigid, undeformable and pressure-resistant side walls; —one opening (37) with an area (A) which faces the area of the damper film (3) limiting the damper chamber (4) in such a way that the damper chamber (4) and the control chamber (36) lie directly opposite each other and are separated from each other only by the damper film (3); and —a connector arranged in one of the rigid, undeformable and pressure-resistant side walls of the housing (31) of the control chamber (36) for a pressure-tight connection of the control chamber (36) to an external pressure source with a pressure (ps) to allow a control fluid to flow into between the external pressure source and the control chamber (36) in order to achieve a pressure equalization between the pressure (pc) in an entire cavity space of the control chamber (36) and the pressure (ps) of the external pressure source; —wherein, in the entire area (A) of the opening (37), the damper film (3) is only in contact with a movable part of the refill valve (5), so that an entire force (F) exerted by the control chamber (36) onto the damper film (3) is defined by (Continued)

the formula: $F=\Delta p*A=(pc-pd)*A=(ps-pd)*A$, where pd is the pressure in the damper chamber (4), and the resulting force (F) is transferred to the movable part of the refill valve (5) in order to: (i) exert an adjustable pretensioning on the refill valve (5) in the printing mode of operation, and/or (ii) open the refill valve (5) to create a continuously open channel through the pressure absorber for rinsing the ink or ink-jet printer head in a purging mode of operation.

17 Claims, 5 Drawing Sheets

(56) References Cited

U.S. PATENT DOCUMENTS

2004/0196341 A1* 10/2004 Ogura .................. B41J 2/17559 347/86
2010/0053283 A1* 3/2010 Ito ........................ B41J 2/17596 347/92
2010/0231668 A1* 9/2010 Ito ........................ B41J 2/17509 347/92
2010/0245465 A1* 9/2010 Nakamura ........... B41J 2/16526 347/30
2012/0026256 A1 2/2012 Shibata
2012/0127242 A1 5/2012 Koike et al.
2012/0140006 A1 6/2012 Yunoki et al.
2015/0251430 A1* 9/2015 Ishii ........................... B41J 2/18 347/30
2016/0257126 A1 9/2016 Ishida
2017/0087868 A1 3/2017 Miyashita et al.
2017/0151805 A1 6/2017 Sato et al.
2017/0151806 A1 6/2017 Kobayashi
2017/0217176 A1 8/2017 Sato et al.
2017/0225456 A1 8/2017 Watanabe et al.
2017/0266979 A1 9/2017 Hori et al.

* cited by examiner

DEVICE AND METHOD FOR CLEANING AND/OR OPERATING AN INK-JET PRINTER HEAD EQUIPPED WITH AN UPSTREAM PRESSURE ABSORBER

REFERENCE TO PENDING PRIOR PATENT APPLICATIONS

This patent application is a continuation-in-part of pending prior U.S. patent application Ser. No. 16/707,193, filed 9 Dec. 2019 by Jan Franck for DEVICE AND METHOD FOR CLEANING AND/OR OPERATING AN INK-JET PRINTER HEAD EQUIPPED WITH AN UPSTREAM PRESSURE ABSORBER, which patent application is a 371 national stage entry of International (PCT) Patent Application No. PCT/IB2018/000616, filed 11 Jun. 2018 by Jan Franck for DEVICE AND METHOD FOR CLEANING AND/OR OPERATING AN INK-JET PRINTER HEAD EQUIPPED WITH AN UPSTREAM PRESSURE ABSORBER, which in turn claims benefit of German Patent Application No. DE 20 2017 003 026, filed 9 Jun. 2017.

The three (3) above-identified patent applications are hereby incorporated herein by reference.

FIELD OF THE INVENTION

The invention relates to a device and to a method for cleaning and/or operating an ink or ink-jet printer head equipped with an upstream pressure absorber in which the pressure absorber comprises a closed chamber that is at least partially limited by a preferably airtight or liquid-tight film.

BACKGROUND OF THE INVENTION

The problem of having an ink supply that is as uniform as possible was recognized early on when developing ink or ink-jet printers. For example, DE 2 224 590 A describes vibrations of the ink supply tube as a result of which the ink supply can temporarily stop, and it is therefore suggested to dispose a small auxiliary reservoir supplied by the actual ink container on a carriage supporting the writing device and from there to feed the ink in a short, slender tube as vibration free as possible to the actual stylus.

However, it is described as disadvantageous that vibrations can be caused on a carriage which for example result in the increased formation of air bubbles. The ink conveyed on the carriage also represents an additional mass that must be additionally accelerated every time the speed of the carriage changes, thereby causing more pressure impacts in the ink system.

To reduce pressure fluctuations in an auxiliary reservoir for ink carried along on the carriage side as much as possible, DE 31 37 970 A1 suggests disposing a flexible bladder inside an auxiliary reservoir of this kind whose interior space is connected to the atmosphere so that the pressure of the ink inside the auxiliary reservoir always remains substantially constant, namely substantially at the level of the atmospheric pressure. However, the construction of a system of this kind is very laborious.

A similar arrangement can be found in US 2012/0026256 A1, which refers to a liquid supplying apparatus, which supplies liquid to an inkjet head or the like; a pressure buffering unit includes an auxiliary tank with an elastic membrane, which separates a liquid chamber for the ink from an air chamber which communicates with the ambient air. Pressure fluctuation are minimized by the elastic membrane, which allows an inner overpressure to be relieved by a bulging out of the membrane. On the other hand, the liquid chamber is permanently open for a refilling, and therefore, it is rather impossible to create a negative pressure by such an arrangement, although most print heads require a negative pressure at their feeding line. The entire area of the membrane which separates the two chambers from each other is never in contact with any rigid element.

The latter problem is solved by an arrangement as disclosed in the US 2016/0257126 A1. There, an auxiliary ink chamber comprises a refill valve, which is normally closed and then interrupts any flow of ink from a main tank into the auxiliary ink chamber. On the other hand, if the amount of ink within the auxiliary ink chamber decreases, a membrane limiting the auxiliary ink chamber is deflected and opens a refill valve in order to replenish the auxiliary ink chamber with ink. Furthermore, in order to allow a cleaning of the ink head with ink, the refill valve can be opened by use of an eccentric cam which pushes against the outside of the membrane if it is rotated to such rotation angle, where its eccentric part faces the membrane. On the other hand, such a cam is not sensitive to the pressure within the auxiliary ink chamber, but either acts onto the membrane and opens the refill valve or not. In the state of opening the refill valve, the membrane which separates the two chambers from each other is in contact with two rigid element, namely with the cam on the one side and with a movable part of the refill valve on the other hand. Furthermore, a cam urging against a movable part of a refill valve has never the ability to exert a negative pressure onto such refill valve.

The same is true for the arrangement disclosed in the US 2017/0151806 A1, where a balloon in an air chamber presses against a middle portion of a diaphragm partially delimiting a liquid storage chamber for ink. Here, two elements are permanently in contact with the diaphragm in the standard mode of operation: the balloon in the air chamber and the refill valve in the liquid storage chamber. The actual force exerted by a balloon onto the diaphragm is unknown, because, due to the behaviour of the balloon envelope, the expanding of the balloon is a non-linear function of the inner overpressure. Therefore, the moment when the refill valve actually opens cannot be estimated, and therefore, the balloon has to be filled with a rather high overpressure to be sure that the refill valve opens. Due to such high overpressure, ink is pressed out of the nozzles of the ink head, what is an unwanted side effect. Furthermore, by such an arrangement, even if a negative pressure is applied to the balloon volume, such negative pressure will have no influence on the diaphragm.

The US 2017/0151805 A1 has nearly the same disclosure that the US 2017/0151806 A1, except the fact that the diaphragm is neither plain nor plane in this document, but has corrugations to provide it with a minimum flexibility, because the diaphragm itself is made oóut of several layers bonded together, which make the diaphragm rather hard and inflexible. Such an inflexible diaphragm is not sensitive for the pressure inside the liquid storage chamber for ink. Therefore, even the standard mode of operation, where a deflection of the diaphragm opens or closes the refill valve, is impaired by such a non-flexible diaphragm. Especially, a small negative pressure of the ink cannot be stabilised.

DE 35 25 810 A1 shows a damping and filtering element for the ink supply to an ink-jet print head having a tray-shaped, meandering depression in a bottom part which is sealed at the top by a flexible wall and thus separated from the atmospheric pressure above the flexible wall. In the event of pressure fluctuations, the flexible wall can temporarily deflect toward the inside or the outside for a short time, thereby dampening a pressure fluctuation of that kind. The space in the tray-shaped depression is sealed off from the atmosphere, but not from a supply tube, from which, in the absence of a valve, pressure fluctuations can constantly come. The bottom part is provided with a fastening wall that serves as a sealing plate, on which the actual ink-jet printer head can be secured by means of screws. A suction channel leads from the meandering recess in a bottom part to a gap between the sealing plate and the ink-jet printer head and feeds the ink liquid that is free of trapped air to a hollow space having piezoceramic pressure generators of the ink-jet printer head. Presumably for cleaning purposes, a second channel that dead ends on an outer connector—presumably for a cleaning tube—is provided in the fastening wall serving as sealing plate for assembly of the inkjet printer head. A cleaning tube would have to be manually connected to said connector for cleaning purposes. A cleaning tube of this kind cannot remain permanently connected because pressure fluctuations would be introduced back into the printing system. However, manual connection and disconnection of a cleaning tube prevents automated cleaning.

DE 690 06 521 T2 describes a plate-shaped pressure absorber for an ink-jet printer having one or a plurality of damper chamber(s) which inter alia is (are) limited by a flexible film in the (each) area of the bottom side(s) of the plate. This (these) flexible film(s) can compensate for pressure fluctuations by means of corresponding deflection. A filter is also provided to remove air bubbles and other impurities from the ink. When an irregular discharge of ink occurs with an ink-jet print head, cleaning is carried out to apply pressure or tensile force to the ink in the ink line, thereby expelling the foreign material from the clogged jets. However, in this device the pressure absorber has a continuous channel from its inlet to its outlet, which on the one hand impairs its dampening ability and on the other hand makes it difficult to create the negative pressure necessary for modern piezo-ink-jet printer heads because ink is immediately suctioned back upon each occurrence of negative pressure.

The problem initiating the invention, which is to develop the simplest possible device for cleaning a printer head, including an upstream pressure absorber, in which the pressure absorber is supposed to have good damping characteristics and is also supposed to be able to generate and maintain the negative pressure necessary for piezo-ink-jet printer heads, results from the disadvantages of the described prior art.

SUMMARY OF THE INVENTION

The solution to this problem succeeds in a device of this type having a valve arranged in the chamber for refilling said chamber with ink from an ink reservoir or intermediate container in response to a curvature of the film into the chamber by means of a controllable device arranged outside the chamber to exert an external pressure on at least one area of the film limiting the chamber until the valve arranged in the chamber opens, thereby creating a continuously open channel through the pressure absorber to clean the ink or ink-jet printer head, as claimed in claim 1.

Due to the refill valve inside the damper chamber of the pressure absorber, the bilaterally open channel within the dampener in accordance with DE 690 06 521 T2 is sealed on the inlet side as long as the refill valve is closed. As a result, on the one hand the pressure inside the damper chamber is completely uncoupled from pressure fluctuations on the inlet side and only coupled to the ink inlet system for a short time during brief refilling phases. Furthermore, the refill valve can be adjusted in such a way that it opens when there is a negative pressure threshold value below that typical of piezo-ink-jet-printer heads; it can even be adjusted so that it closes again when there is a continued negative pressure value (i.e., below atmospheric pressure), so that the pressure in the damper chamber never reaches atmospheric pressure. This refill valve can respond to the deflection of the damper film as a result of the pressure difference between the inside pressure of the ink and the outside atmospheric pressure. Because it is disposed completely within the damper chamber, however, it cannot be opened from the outside, so a cleaning process through the pressure absorber is impossible. Therefore, an external cleaning connector is provided, similar to the one in DE 35 25 810 A1. As is the case there, however, automatic cleaning is not possible here, either, because the cleaning tube must be manually removed after each cleaning process to avoid pressure fluctuations. Therefore, an externally actuatable device for exerting an external pressure on at least one area of the film limiting the chamber is provided outside the chamber. As a result, a pressure difference on the damper film is created which is greater than the pressure of the ink in the damper chamber, thereby simulating an inside negative pressure, which causes the internal refill valve to open, thereby releasing a continuous channel for cleaning the printer head. After completion of the cleaning process, the outer pressure is removed from the damper film by means of an appropriate control signal—only atmospheric pressure is then applied, and therefore the refill valve again responds only to an inside negative pressure, above which it closes.

The invention is also distinguished by a control chamber having at least one opening facing the area of the of the damper film limiting the damper chamber. As a result of this design, the damper chamber and the control chamber lie directly opposite each other and are separated from each other only by the damper film. The damper film is now subject to the pressure difference between the pressures in the damper chamber and in the control chamber and curves into the chamber, where the pressure is lower. While the pressure in the damper chamber will usually be close to atmospheric pressure, perhaps a bit lower because a printer head typically requires a slightly negative pressure, the pressure in the control chamber can be varied within a wide range, and as a matter of principle both negative pressure in relation to atmospheric pressure and excess pressure in relation to atmospheric pressure are conceivable. However, this pressure inside the control chamber, in contrast to the pressure in the damper chamber, can be actively influenced from the outside. Therefore the curvature of the damper film can at all times be deliberately influenced and thus also adjusted in such a way that as a result the refill valve in the damper chamber is opened. If said refill valve is opened in this way, the printer head can be cleaned with ink simply by exerting pressure from the ink reservoir side, for example by means of a pump.

As the controllable device does not act onto the damper film in the form of a local force, but as a global pressure dispersed over the entire area of the damper film which is exposed to both chambers, even an underpressure can be exerted onto the damper film.

On the other hand, by measuring the pressure in the control chamber, one can detect the moment of the opening of a refill valve exactly. When the refill valve opens, ink flows into the damper chamber and the underpressure is reduced. This measurement can be done externally in a control device, independent of the fact whether the pressure in the control chamber is less than or equal to or more than the pressure in the damper chamber.

To be able to deliberately influence the pressure inside the control chamber, it must be hermetically sealed or sealable against the environment, i.e., the atmosphere. The control chamber normally has only one opening, which faces the damper film, as well as optionally another connector, from which the filling pressure or the filling volume can be influenced. In the event that two or more printer heads are to be cleaned simultaneously, the control chamber could also have a plurality of openings which would then each face one of the damper films of the different pressure absorbers.

An optimum effect results when the opening in the control chamber is substantially just as large as the opening in the damper chamber covered by the damper film so that the damper film can freely move on its entire flexible area between the two chambers.

The position of the damper film can thus adjust itself differently in response to a varying filling pressure inside the control chamber and/or in response to a varying mass or quantity of a fluid inside the control chamber; both effects influence the pressure and the actual volume of the control chamber and accordingly the displacement of the damper film between the control chamber and the damper chamber. The control chamber could therefore be filled with a different fluid than the damper chamber is, in particular even with a liquid such as ink or with water. However, filling the control chamber with air offers the advantage that it behaves exactly like atmospheric air outside of the control chamber, so the control chamber in unpressurized condition, i.e., without excess pressure and without negative pressure in relation to atmospheric pressure, is not perceptible by the damper film and thus the original switching behavior, namely the pressure-dependent opening of the refill valve when there is negative pressure in the damper chamber, and closing such as after a pressure equalization, is not impaired. This unpressurized condition can be produced at any time by opening a valve between the control chamber and the atmosphere.

The invention can be further developed so that the opening in the control chamber facing the damper film is covered by a control film. A thin control film of this kind offers the advantage of a flexibility and can therefore respond sensitively to a changed filling mass and/or a changed filling pressure inside the control chamber. A control film of this kind can then form a planar contact with the actual damper film so that both of them together behave practically like a single film. However, the use of a dedicated control film is primarily recommended when air is not used as control fluid. The control device can then be disassembled from the pressure absorber without the control fluid escaping. A control film of this kind should naturally also be configured to be airtight and/or liquid tight. A control film of this kind should be flexible and/or elastic so that its displacement is easily controllable, and, to anchor it and simultaneously to seal the control chamber, it should be firmly secured circumferentially on the edge of the opening in the control chamber.

Moreover, it has proven effective for the opening in the control chamber to have substantially the same dimensions as the edge area of the damper chamber formed by the damper film. As a result, the pressure difference between the two chambers has a maximum influence on the damper film and leads to an optimum deflection of them.

The opening in the control chamber should have a circular periphery so that the damper film can uniformly deflect over its entire surface without local overstressing of individual surface areas.

Because the housing of the control chamber is secured or securable on the pressure absorber, thrust bearing forces that are caused by the pressure in the control chamber and, in the event of excess pressure, attempt for example to press the control device away from the pressure absorber, can be directly diverted to the pressure absorber. Gluing, for example, provides a simple method of securing; other types of fastening such as screws are removable and therefore optionally allow replacement of the control device in accordance with the invention, independent of the pressure absorber itself.

A flow of a control fluid into the control chamber or out of the control chamber is allowed by disposing a connector for a control line on the housing of the control chamber.

At such a connector, a pressure source can be connected which is able to generate an overpressure and/or a negative pressure, depending on which kind of pressure is desired. For example, a transient overpressure can be used to open the refill valve, while a negative pressure serves to stabilise a negative pressure in the liquid storage chamber.

The invention is also distinguished by the use of air as control fluid. It is always present in sufficient quantity in the atmosphere and there is therefore no need to stock it. A compressor can compress the air for filling the control chamber; to empty it, an outlet valve can simply be opened, whereupon a pressure equalization with the atmosphere can take place.

When the refill valve is closed, the damper film should be in a plane condition. Normally, this is the standard mode of operation, where the ink should be subjected to a negative pressure. On the other hand, if the damper film would be bulged out into the control chamber in such mode of operation, it would clearly exert an overpressure onto the ink inside the damper chamber.

Furthermore, the invention recommends that the damper film is made of a material of a Shore hardness of 80A or more or a Shore hardness of 40 D or more, or a Shore hardness of 85A or more or a Shore hardness of 45 D or more, or a Shore hardness of 90A or more or a Shore hardness of 50 D or more. A material showing such hardness properties is polyurethane. Such materials are rather inelastic and the only way of a deformation is a flexure orthogonal to the surface of the damper film. On the other hand, such materials are less suszeptible against injuries, whereby the lifespan of an apparatus according to the invention is extended. Furthermore, due to a lack of an extensive elasticity, the damper film is required to react to a pressure difference between both sides of the damper film by a continuous curved deformation of its entire area being exposed to the pressure difference, for example in a way like a section of a spherical surface or of an ellipsoid surface.

Due to a rather rigid consistency of the preferred material, it is possible that the damper film has a thickness of 100 μm or less, or a thickness of 50 μm or less, or a thickness of 20 μm or less. On the other hand, such a thin material has a neglectable influence on the force generated by the pressure difference on both sides of the damper film.

To achieve such a thin damper film, it is advantageous to use a damper film which is made of one single layer only.

It is further preferred if the control chamber has a disc-shaped cavity, especially with a constant thickness, in order to give the damper film a space where it can choose its position rather freely, without getting in contact with any other body which would impair the function of the damper film according to the invention.

In this context, it is essential that the control chamber is completely empty and only filled with a fluid. The purpose of the fluid is to equalize the pressure within the control chamber.

On the other hand, it would be advantageous that the damper chamber is completely empty between the side walls of the damper chamber, too, and only filled with ink. Before being printed onto a substrate, the purpose of the ink is to buffer pressure fluctuations produced for example in the print head. Therefor, all flow directing elements and all elements possibly getting in contact with the damper film should be omitted inside of the damper chamber. The movement of the damper film should be restricted as less as possible, so that the damper film can choose its position within the damper chamber free.

The invention prefers an arrangement where the external pressure source is able to generate an overpressure. This is necessary in order to open the refill valve within the damper chamber.

On the other hand, the apparatus according to the invention can be further improved if the external pressure source is able to generate a negative pressure, compared to the ambient air pressure. A negative pressure inside of the control chamber enables the controllable device to assist in the implementation of a negative pressure in the ink contained in the damper chamber.

The external pressure source should be adjustable, so that an end user or a control unit is able to decide at each moment whether the refill valve is to be opened by raising the pressure of the external pressure source, or whether the refill valve should be closed in order to return to the standard mode of operation.

Furthermore, the external pressure source can be regulated, for example to a negative pressure of 20 mbar or the like which is required by most inkjet print heads.

An optimum regulation is possible, if the external pressure source can be adjusted or regulated to generate overpressure as well as negative pressure, depending on the actual predefined set value.

It is within the scope of the invention that a pressure sensor is arranged on the control chamber and/or on the control line in order to be able to record and/or regulate the control pressure. This allows a control loop to be produced, for example to guarantee reliable operation and/or to avoid tearing of a film due to excess pressure. As explained above, such a pressure sensor can assist in recognizing the moment when the refill valve is opened or closed, because in the open state of the refill valve, ink flow into the damper chamber and presses the damper film ourwardly what can be recognized as a rising pressure inside of the control chamber, although the pressure of the pressure source is kept constant.

A pressure sensor can also be arranged on the pressure absorber or downstream of it in order to be able to detect opening of the refill valve in the damper chamber. That is because a refill valve of this kind is usually opened as a consequence of the inwards curvature of the damper film, particularly when said inwards curvature is attributable to a negative pressure inside the damper chamber. Said pressure rises again when the refill valve is opened.

The refill valve in the damper chamber can be pretensioned into a closed position by a spring element. Said spring element can simultaneously act directly or indirectly on the damper film and pretension it toward the outside or curve it toward the outside, thereby forming a counteracting force for an external air pressure, which is therefore normally unable to open the refill valve. It is only when the pressure inside the damper chamber decreases due to consumption of the ink contained in it, following a certain level of hysteresis, that the outside pressure gains the upper hand and the refill valve can open, in this way producing a simple two-point control.

This coupling can be executed in such a way that the spring element presses a movable element of the refill valve in pretensioned condition from the inside against the damper film, as well as optionally together with it in a direction toward the outside.

Finally, it corresponds to the teaching of the invention for the control pressure of the control fluid necessary to open the refill valve to be greater than the force of the spring element necessary to close the refill valve divided by the surface area of the damper film. In cases of this kind, a pressure can be exchanged over the damper film, i.e., in steady state the effective total forces on both sides of the damper film—inside the control chamber on the one hand and inside the damper chamber on the other hand—are substantially equal. On the side of the control chamber, only the control pressure contained in it has an effect, whereas on the side of the damper chamber the pressure there on the one hand and optionally the pretensioning of a spring element on the other hand have an effect. Assuming that the pressure in the damper chamber corresponds substantially to the atmospheric pressure, the latter is already compensated without additional control pressure, in other words already when atmospheric pressure prevails in the control chamber. A control pressure inside the control chamber—in other words an excess pressure in relation to the atmospheric pressure—must therefore in principle above all apply or overcome the pretensioning force of a spring element inside the damper chamber.

A device in accordance with the invention can also be used to operate an ink or ink-jet printer head equipped with an upstream pressure absorber, with the pressure absorber comprising a closed damper chamber that is at least partially limited by a damper film in which a refill valve is arranged for refilling the damper chamber with ink in response to a curvature of the damper film into the damper chamber, to the extent a controllable device is provided outside the damper chamber for exerting a preferably variable and/or prespecified external pressure on at least one area of the damper film limiting the damper chamber in order to exert an adjustable pretensioning on the refill valve arranged in the damper chamber. Without a device of this kind, the pretensioning is dependent only on the atmospheric pressure, which is subject to weather-related fluctuations. But altitude above sea level also has a perceptible influence on atmospheric pressure. Because the switch-on and switch-off threshold is only a few millibars of differential pressure, fluctuations or deviations of this kind can have a negative effect on the pressure result. With a device in accordance with the invention, however, a switching threshold for an internal refill valve can be adjusted to a specific value. To do this, away from the membrane of a damper chamber, i.e., outside of it, a (counter) pressure that acts from the outside can be kept precisely constant and/or, depending on requirements, controlled to specific pressure values.

Consequently the invention can also be described as a device for operating and/or cleaning an ink or ink-jet printer head equipped with an upstream pressure absorber, with the pressure absorber comprising a closed damper chamber that is at least partially limited by a damper film, surrounding a refill valve arranged in the damper chamber for refilling the damper chamber with ink in response to a curvature of the damper film into the damper chamber, and a controllable device arranged outside the damper chamber for exerting an external pressure on at least one area of the damper film limiting the damper chamber in order to open the refill valve arranged in the damper chamber and also to create a continuously open channel through the pressure absorber for cleaning the ink or ink-jet printer head and/or to exert an adjustable pretensioning on the refill valve arranged in the damper chamber.

BRIEF DESCRIPTION OF THE DRAWINGS

Additional features, details, advantages, and effects based on the invention result from the following description of a preferred embodiment of the invention and in reference to the drawings, in which.

DETAILED DESCRIPTION OF THE PREFERRED EMBODIMENTS

Figure 1:
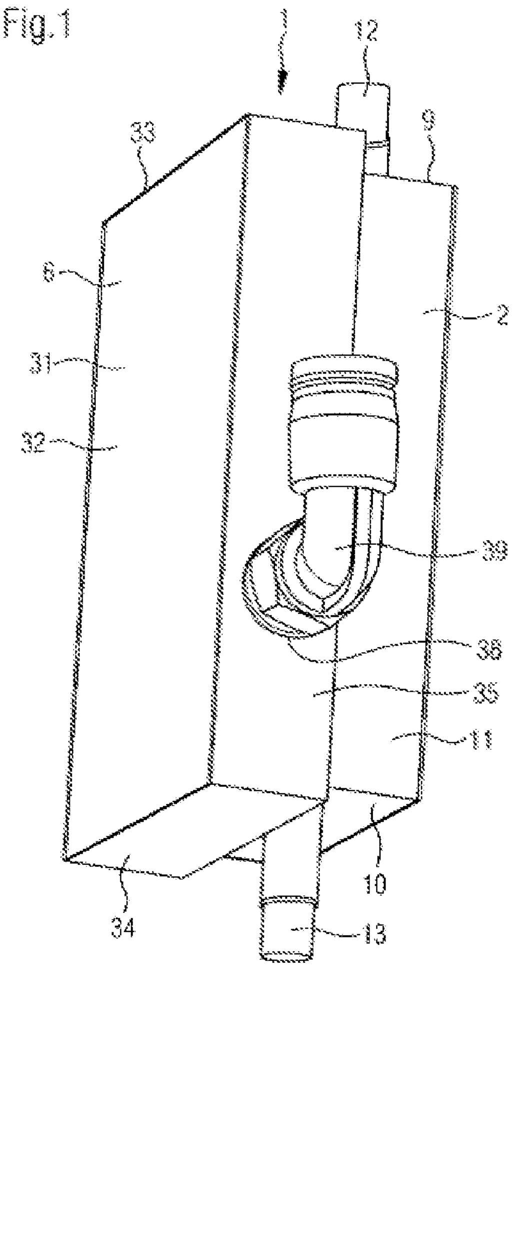
FIG. 1 shows a perspective view of a device in accordance with the invention for cleaning an ink or ink-jet printer head, installed on a pressure absorber arranged upstream of the ink or inkjet printer head.

Device 1 shown in FIG. 1 of the drawings serves the purpose of cleaning an ink or ink-jet printer head (not shown) with ink through an upstream pressure absorber 2.

The internal structure of pressure absorber 2 can be recognized in FIGS. 2 to 5:

Pressure absorber 2 comprises a closed damper chamber 4 at least partially limited by a damper film 3 in which a refill valve 5 is provided which controls the refilling of damper chamber 4 with ink in response to a curvature of damper film 3 into damper chamber 4.

Whereas the entire pressure absorber module 2 has a parallelepiped structure, the actual damper chamber 4 contained in it is substantially in the shape of a circular disc. However, housing 7 of pressure absorber 2 has the shape of a frame 8 open on both flat sides which has four walls connected to each other, namely an upper side 9, a lower side 10, and two longitudinal sides 11 connecting them to each other.

A first tube connector support 12 for a first tube, leading for example to an ink reservoir, is located on upper side 9.

A second tube connector support 13 for a second tube that feeds the ink further on to the actual printer head is located on lower side 10. This connection can naturally also be made without a tube if the pressure absorber is located in immediate proximity to the printer head.

Figure 2:
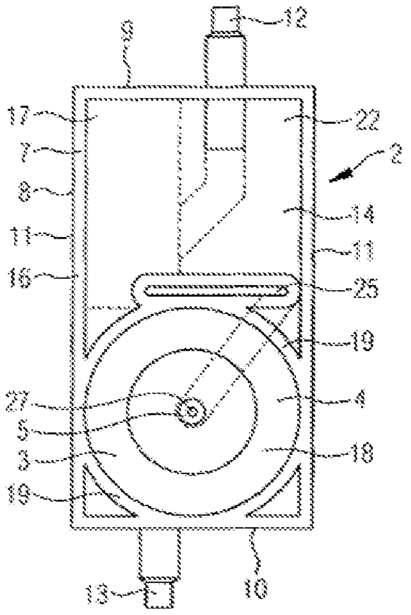
FIG. 2 shows the pressure absorber of the arrangement in accordance with FIG. 1 in a front view, with the cleaning device disassembled.
Figure 3:
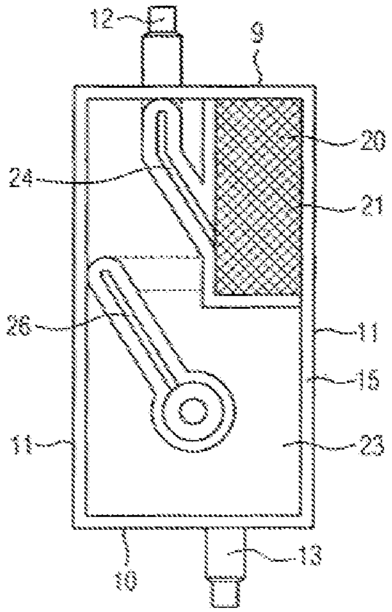
FIG. 3 shows a view from the back of the pressure absorber form FIG. 2.

The two flat sides of housing 7 preferably manufactured as an injection molded part are open; however, upper side 9, lower side 10, and the two longitudinal sides 11 are connected together by an intermediate wall 14 which is preferably closer to back side 15 of frame 8 shown in FIG. 3 than to front side 16 shown in FIG. 2.

Due to the vertical arrangement with an inlet on the upper side and an outlet on the lower side, the ink can flow inside the pressure absorber solely under the influence of gravity.

The interior structure of pressure absorber 2 is divided into an upper section 17 and a lower section 18. The space in lower section 18 before intermediate wall 14 is almost completely occupied by chamber 4, which is surrounded by a cylindrical casing surface 19 disposed concentric to a horizontal axis in the center of lower section 18. Damper chamber 4 does not extend completely over the entire thickness of pressure absorber 2, but rather only from open front side 15 of frame-shaped housing 7 to its intermediate wall 14. Cylindrical casing surface 19 is sectionally connected to lower side 10 and the two longitudinal sides 11, as shown in FIG. 2.

A substantially rectangular filter chamber 20, which adjoins upper side 9 on the one hand and one of the two longitudinal sides 11 on the other hand, is located behind intermediate wall 14 in upper section 17 of the pressure absorber. A fine-meshed ink filter 21 having a base plane parallel to intermediate wall 14 is disposed in said filter chamber 20. Ink filter 21 is at a distance from both intermediate wall 14 and back side 15 of housing 7.

The entire open front side 16 of housing 7 is covered by a flexibly elastic film 22, which is glued on the front leading edges of upper, lower, and longitudinal walls 9, 10, 11, that in the area of damper chamber 4 forms damper film 3 there.

On the other hand, the entire open back side 15 of housing 7 is covered by a less flexible film 23 glued on the rear leading edges of upper, lower, and longitudinal walls 9, 10, 11.

A first flow channel 24 integrated in housing 7 leads from tube connector support 12 on the upper side as ink inlet to the rear part of filter chamber 20, behind ink filter 21.

In the lower area of filter chamber 20, a second flow channel 25 branches laterally from its front part between ink filter 21 and intermediate wall 14 and extends in front of intermediate wall 14 substantially horizontally from filter chamber 20 to the opposite-lying longitudinal side 11 of housing 7.

An aperture through intermediate wall 14 is located there, and a third flow channel 26 connects to it which in turn runs behind intermediate wall 14 along it and extends in relation to damper chamber 4 radially toward the inside up to behind its center 27.

There, namely behind center 27 of damper chamber 4, another aperture to damper chamber 4 is located, and refill valve 5, which ultimately opens with its downstream orifice into damper chamber 4, is then located there.

When refill valve 5 is open, ink can thus flow in from inlet-side tube connector support 12 via first flow channel 24, the rear filter chamber section, through ink filter 21 to the front filter chamber section, and from there further over second flow channel 25 and third flow channel 26, as well as through refill valve 5 into damper chamber 4.

As soon as damper chamber 4 is refilled, refill valve 5 closes again and from there the ink can then be suctioned from the printer head and printed if necessary, while refill valve 5 remains closed and as a result upstream pressure surges can be kept away from damper chamber 4 and thus from the actual printing system.

Refill valve 5 is opened and closed only as a function of the pressure conditions in damper chamber 4. For this to occur, the aperture from third flow channel 26 into damper chamber 4 is covered on its orifice facing flow channel 26 by an internal film or membrane which is normally pressed securely onto the orifice of the aperture by the pressure upstream of damper chamber 4, thereby occluding it.

Said internal film or membrane cannot be opened from the outside but instead only pressed outward, i.e., in the direction toward back side 15 of housing 7, by a central tappet 28 located inside damper chamber 4, with the internal film or membrane being lifted from the upstream orifice of the aperture through third flow channel 26 and damper chamber 4, and refill valve 5 thereby being opened.

Tappet 28 is located on the back side of a plate 29 that lies planar on the inner side of damper film 3. Plate 29 can have a circular-disc-shaped geometry and be integrated with tappet 28 into a single part, for example be manufactured with it as a common injection-molded part.

Tappet 28 is subject to lose guidance inside the aperture between third flow channel 26 and damper chamber 4, and said aperture can be surrounded with a cylindrical edge or skirting projecting into damper chamber 4 to improve the guidance.

Tappet 28 then communicates its position to plate 29, which therefore always remains oriented concentric to center 27 of damper chamber 4.

Furthermore, tappet 28 also serves as guiding core for a spring element, in particular a coil spring 30, which loosely winds around the tappet in the form of a helical line. Said coil spring 30 is supported on the one hand by intermediate wall 14 in the vicinity of the aperture between third flow channel 26 and damper chamber 4 and on the other hand by the back side of plate 29. Coil spring 30 is preshaped in such a way that in unstressed state it is somewhat longer than the thickness of damper chamber 4 between intermediate wall 14 and damper film 3 and therefore attempts to press plate 29 from the inside firmly onto damper film 3 and can even press flexibly elastic damper film 3 slightly toward the outside.

If the printer head now gradually suctions more and more ink out of printer head 4, a negative pressure is produced there, and the atmospheric pressure pressing on the outside of damper film 3 gradually presses together spring 30 that is pretensioned toward the outside, with tappet 28 being pressed increasingly deeper into the aperture between third flow channel 26 and damper chamber 4, and ultimately the film or membrane on the far orifice of the aperture can lift up from it, thereby opening refill valve 5. The ink that then flows in now refills damper chamber 4, and damper film 3 consequently bends toward the outside again, with tappet 28, due to compression spring 30, gradually migrating out from its aperture and the interior film or membrane being able to close again.

This arrangement has the advantage that not only particles and air bubbles in ink filter 21 are held back, but also that pressure surges and fluctuations are kept away from the actual printer head by the membrane of closed refill valve 5, so that printer head is optimally supplied with clean, evenly flowing ink for the printing process.

However, this arrangement has another disadvantage related to the fact that refill valve 5 is arranged entirely inaccessibly from the outside, completely inside damper chamber 4. An external excess pressure upstream of refill valve 5 cannot open it and instead presses the membrane even more strongly against the edge of the aperture between damper chamber 4 and flow channel 26 disposed directly upstream of it.

Pressure absorber 2 would therefore tend to be broken before the ink or ink-jet printer head could be cleaned with ink through pressure absorber 2, if opening refill valve 5 inside damper chamber 4 before cleaning is unsuccessful.

For that purpose, the invention provides for a controllable device 6 arranged outside of damper chamber 4 to exert an external pressure on at least one area of damper film 3 limiting damper chamber 4, in order to open refill valve 5 arranged in damper chamber 4, thereby creating a continuously open channel through pressure absorber 2 for cleaning the ink or ink-jet printer head.

Device 6, which is controllable from the outside, comprises a parallelepiped, preferably plate-shaped housing 31 having two opposite-lying flat sides 32 and four faces connecting them to each other, namely an upper side 33, a lower side 34, and two longitudinal sides 35. As in housing 7 of pressure absorber 2, in housing 31 the upper and lower side 33, 34 can also be of the same size as each other, but they are shorter than the two longitudinal sides 35, which are also identical to each other.

The base surface of housing 31 of controllable device 6 is preferably substantially equal to the base surface of housing 7 of pressure absorber 2. Housing 31 can thus be set or laid flat and substantially congruently on front side 16 of housing 7 and even be affixed there in that position, for example using glue.

Housing 31 encloses a control chamber 36 that has substantially the same geometry and base surface as damper chamber 4 and is also positioned in housing 31 corresponding to the position of damper chamber 4 in housing 7, so that, if pressure absorber 2 and controllable device 6 are congruently joined together, control chamber 36 can also be aligned with damper chamber 4.

Control chamber 36 can have an opening 37 on one or both flat sides 32 of controllable device 6. In the normal case, i.e., to control a single damper film 3, only a single opening 37 should be present, and said flat side 32 that then has a single opening 37 can be referred to below as the front side. Only when two pressure absorbers 2 are to be controlled simultaneously can a second opening 37 be provided, which would then be disposed on the other flat side 32.

It is conceivable to cover opening 37 in control chamber 36 with a film that faces pressure absorber 2. A control film of that kind should be flexibly elastic, at least as flexibly elastic as damper film 3. However, a control film of that kind represents an additional effort and is therefore primarily justified when air is not used as filling medium inside control chamber 36; a control film of that kind would then allow disassembly of the control device without the filling medium escaping.

Controllable device 6 with its flat side 32 having an opening 37 is positioned on front side 16 of pressure absorber 2 in such a way that control chamber 26 and damper chamber 4 lie substantially concentrically against each other and are separated there only by damper film 3.

Control chamber 36 is tightly sealed by housing 31 on the one hand and by damper film 4 covering opening 37 in its flat side 32; however, a control opening 38, which can be provided with internal threading for screwing on a tube connector support, that penetrates the relevant face, i.e., preferably one longitudinal side 35 or lower side 34 of controllable device 6, is located in the edge of control chamber 36. In the embodiment in accordance with FIG. 1, an example of an angular element 39 on which a control tube can be secured is screwed on.

A control medium can then be fed through a control tube of that kind into the control chamber or discharged from it again. The preferred control medium for this is pressurized air or compressed atmospheric air, although a liquid would also be conceivable.

If a control medium is fed or pressed into control chamber 36, under the internal excess pressure that is produced, damper film 4 curves out of control chamber 36 and into damper chamber 4 and, due to plate 29, presses tappet 28 against the internal film or membrane of refill valve 5 and opens it even when no negative pressure prevails in damper chamber 4. Refill valve 5 is now open and the printer head can be cleaned with ink.

If the cleaning process has ended, the excess pressure from control chamber 36 can be discharged and spring 30 again presses plate 29 including tappet 28 as well as adjoining damper film 3 toward the outside, i.e., in the direction from damper chamber 4 to control chamber 36, with refill valve 5 again being closed. If the air has been completely exhausted from control chamber 36 or it is pressure-free, the atmospheric pressure again takes over the counterpart of compression spring 30, and refill valve 5 is again autonomously opened and closed, in order, in the context of a two-point control, to regulate the pressure inside the damper chamber within narrow limits.

In the context of the present invention, the operating point of the spring 30 can also be set by applying variable pressure to the outside of damper film 3 facing away from damper chamber 4. This means that, if spring 30 loses tensional force over time, for example, a stronger deflection of spring 30 can be caused by increasing the pressure on the far side of damper film 3, so that the spring is set to an operating point at which it again produces a stronger spring force that must then be overcome to open refill valve 5.

Figure 6:
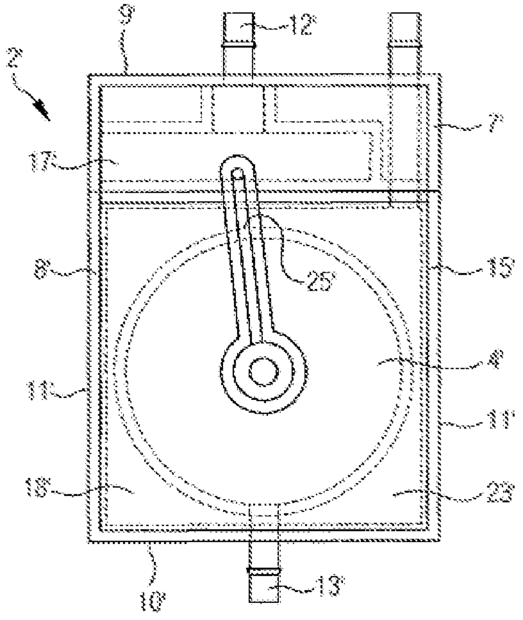
FIG. 6 shows a pressure absorber in accordance with the invention according to another embodiment of the invention, in a front view similar to FIG. 2.
Figure 7:
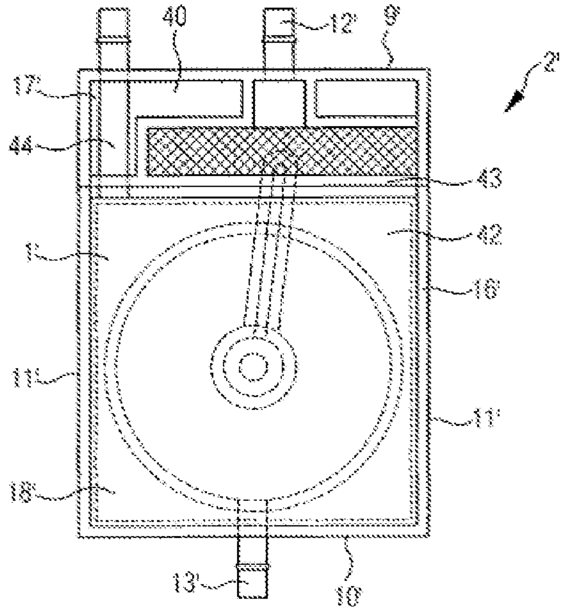
FIG. 7 shows a view from the back of the pressure absorber from FIG. 6.
Figure 8:
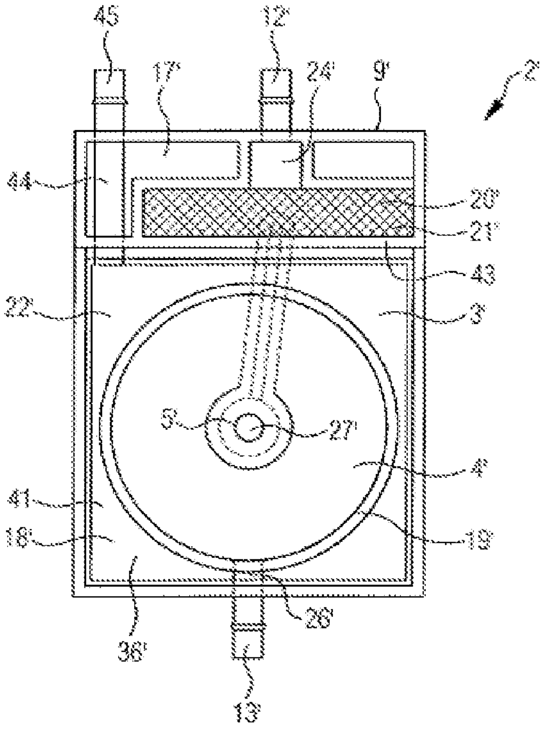
FIG. 8 shows a cross-section through the pressure absorber from FIG. 6 along a center sectional plane parallel to the front side.

Device 1' for cleaning an ink or ink-jet printer head (not shown) with ink by means of an upstream pressure absorber 2' which is shown in FIGS. 6 to 8 is an integrated embodiment in which cleaning device 1' is integrated with pressure absorber 2'.

The fundamental structure and functioning are the same as in the embodiment in accordance with FIGS. 1 to 5, so corresponding parts in the drawings have been given corresponding reference numbers.

FIG. 8 corresponds most closely to FIG. 2 because in both cases—in one case by removing device 1 in FIG. 2, in the other case by a section through device 1' integrated with pressure absorber 2'—substantially only pressure absorber 2, 2' is to be seen, viewed from its damper film 3, 3' covering damper chamber 4, 4'.

Housing 7' in the form of a frame 8' having an upper side 9', a lower side 10', and two longitudinal sides 11' connecting them which surrounds pressure absorber 2' on the outside will be recognized. An inlet-side tube connector support 12' is located on upper side 9', and an outletside tube connector support 13' is located on lower side 10'.

In contrast to device 1 with pressure absorber 2, in the second embodiment the depth dimension of frame 8'—i.e., the distance between its back side 15' and its front side 16'—does not correspond to the depth dimension of damper chamber 4' or of pressure absorber 2' containing it, but rather is greater than that and corresponds to the sum of the depth dimensions of pressure absorber 2' on the one hand and of device 1' in accordance with the invention for controlling refill valve 5' inside damper chamber 4'.

Pressure absorber 2' itself is divided into an upper section 17' and a lower section 18'. Whereas actual damper chamber 4' is located in lower section 18'—surrounded by a preferably cylindrical casing surface 19'—an optional filter chamber 20' having an ink filter 21' is disposed in upper section 17'. Filter chamber 20' is connected upstream of ink filter 21' by a first flow channel 24' having inlet-side tube connector support 12', while a second flow channel 25' connects the part of filter chamber 20' downstream of ink filter 21' with refill valve 5' in center 27' of damper chamber 4'.

A third flow channel 26' then leads from the periphery of damper chamber 4' to outlet-side tube connector support 13'.

Figure 4:
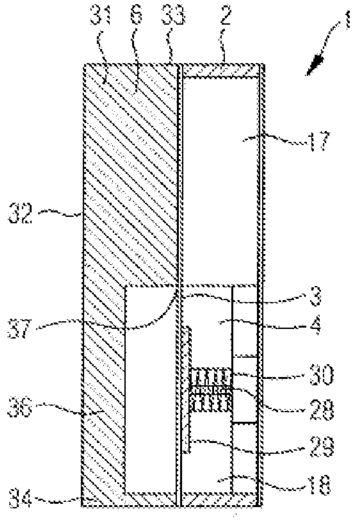
FIG. 4 shows a longitudinal section through the arrangement in accordance with FIG. 2 in normal pressure condition.
Figure 5:
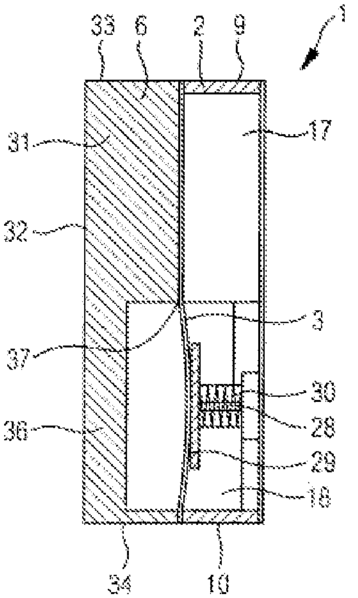
FIG. 5 shows a longitudinal section corresponding to FIG. 4 through FIG. 2 during cleaning.

The interior structure of refill valve 5' can be identical to refill valve 5 in accordance with FIGS. 4 and 5 or have a similar or equally effective structure.

Actual pressure absorber 2' can, as in the first embodiment, be covered on its two flat sides by at least one film each, namely by a front film 22' and by a rear film 23'.

In the illustrated embodiment, front film 22' is, however, divided into a first film section 40 covering upper section 17' of pressure absorber 2' and into a second film section 41 covering lower section 18' of pressure absorber 2'.

The two film sections 40, 41 do not lie in the same plane but rather in planes parallel to each other. In particular, first film section 40 is at a distance to rear film 23' corresponding to the total depth of housing-side frame 8', while second film section 41 is at a relatively reduced distance that corresponds only to the depth dimension of damper chamber 4'.

As a result, frame 8' can be additionally sealed in its lower section 18', namely on its front side 16', by a preferably rigid covering 42. Said covering 42 can lie in a common alignment with first film section 40 in upper section 17' of housing 7'.

The result is a control chamber 36' that is sealed in an airtight manner from the outside between said covering 42, second film section 41 lying behind it, lower side 10' of frame 8' and its longitudinal sides 11', as well as an intermediate wall 43 separating the two sections 17', 18' from each other. It communicates with the outside space of the assembly comprising pressure absorber 2' and control device 1' only through a channel 44 leading from control chamber 36' to frame 8', preferably to its upper side 9', and terminates in a tube connector support 45 there, to which a control tube (not shown) can be connected.

If excess pressure is induced in control chamber 36' through tube connector supports 45, second, lower film section 41 will curve into damper chamber 4', thereby opening refill valve 5'. In contrast, if control chamber 36' is unpressurized, lower film section 41 will relax and refill valve 5' will close.

| List of reference numbers | |
|---|---|
| 1 | Device |
| 2 | Pressure absorber |
| 3 | Damper film |
| 4 | Damper chamber |
| 5 | Refill valve |
| 6 | Device |
| 7 | Housing |
| 8 | Frame |
| 9 | Upper side |
| 10 | Lower side |
| 11 | Longitudinal side |
| 12 | Tube connector support |
| 13 | Tube connector support |
| 14 | Intermediate wall |
| 15 | Back side |

-continued

| List of reference numbers | |
|---|---|
| 16 | Front side |
| 17 | Upper section |
| 18 | Lower section |
| 19 | Casing surface |
| 20 | Filter chamber |
| 21 | Ink filter |
| 22 | Front film |
| 23 | Rear film |
| 24 | First flow channel |
| 25 | Second flow channel |
| 26 | Third flow channel |
| 27 | Center |
| 28 | Tappet |
| 29 | Plate |
| 30 | Coil spring |
| 31 | Housing |
| 32 | Flat side |
| 33 | Upper side |
| 34 | Lower side |
| 35 | Longitudinal side |
| 36 | Control chamber |
| 37 | Opening |
| 38 | Control opening |
| 39 | Angular element |
| 40 | First film section |
| 41 | Second film section |
| 42 | Covering |
| 43 | Intermediate wall |
| 44 | Channel |
| 45 | Tube connector support |

What is claimed is:

1. A method for operating and for cleaning an ink print head (DOD) or an ink-jet printer head (CIJ), equipped with:

an upstream pressure absorber (2), which comprises a closed damper chamber (4) that is at least partially limited by a plain damper film (3) made of a flexible material so that it reacts to a pressure difference (Δp) between both areas of the film with a curved deformation, a refill valve (5) arranged in the damper chamber (4) for refilling the damper chamber (4) with ink in a printing mode of operation as a response to a curved deformation of the damper film (3) into the damper chamber (4), wherein the damper film (3) is flexibly elastic, the method comprising the following steps:

providing:

an external pressure source for generation of a pressure ($p_s$), wherein the external pressure source is adjustable and is able to generate an overpressure as well as a negative pressure, compared to an ambient air pressure, and a controllable device (6) arranged outside of the damper chamber (4) in such a way that an external pressure ($p_c$) is exerted on at least one area of the damper film (3) limiting the damper chamber (4), the controllable device (6) comprising a control chamber (36) having:

a housing (31) consisting of rigid, undeformable and pressure-resistant side walls;

one opening (37) with an area (A) which faces the area of the damper film (3) limiting the damper chamber (4) in such a way that the damper chamber (4) and the control chamber (36) lie directly opposite each other and are separated from each other only by the damper film (3), wherein the opening (37) in the control chamber (36) has a circular periphery, so that the damper film (3) can uniformly deflect over its entire surface without local overstressing of individual surface areas; and a connector arranged in one of the rigid, undeformable and pressure-resistant side walls of the housing (31) of the control chamber (36) for a pressure-tight connection of the control chamber (36) to the external pressure source with the pressure ($p_s$) to allow a control fluid to flow between the external pressure source and the control chamber (36) in order to achieve a pressure equalization between the pressure ($p_c$) in an entire cavity space of the control chamber (36) and the pressure ($p_s$) of the external pressure source;

generating, by an end user or by a control unit, an actual pre-defined set value for the external pressure source to generate, as the external pressure ($p_c$), either (i) an overpressure in order to open the refill valve (5) within the damper chamber (4) in a purging mode of operation, or (ii) a negative pressure, compared to the ambient air pressure, in order to assist in the implementation of a negative pressure in the ink contained in the damper chamber (4) in a printing mode of operation, adjusting or regulating the external pressure source to generate an overpressure or a negative pressure, compared to the ambient air pressure, depending on the actual pre-defined set value, further providing that, in the entire area (A) of the opening (37), the damper film (3) is only in contact with a movable part of the refill valve (5), so that an entire force (F) exerted by the control chamber (36) onto the damper film (3) is defined by the formula:

$$F=\Delta p*A=(p_c-p_d)*A=(p_s-p_d)*A,$$

where $p_d$ is the pressure in the damper chamber (4), transferring the resulting force (F) to the movable part of the refill valve (5) in order to:

(a) exert an adjustable pretensioning on the refill valve (5) in the printing mode of operation, or (b) open the refill valve (5) to create a continuously open channel through the pressure absorber for rinsing the ink print head or the ink-jet printer head in a purging mode of operation.

2. The method as in claim 1, wherein the opening (37) of the control chamber (36) has substantially the same area (A) as an edge area of the damper chamber (4) formed by the damper film (3).

3. The method as in claim 1, wherein the opening (37) of the control chamber (36) has a circular periphery.

4. The method as in claim 1, wherein the housing (31) of the control chamber (36) is secured or securable on the pressure absorber (2).

5. The method as in claim 1, characterized by air as the control fluid.

6. The method as in claim 1, wherein a pressure sensor is arranged on the control chamber (36) and/or on the control line to be able to record and/or regulate the control pressure.

7. The method as in claim 1, wherein a pressure sensor is arranged on the pressure absorber (2) or downstream of it to make it possible to detect opening of the refill valve (5) in the damper chamber (4).

8. The method as in claim 1, wherein the refill valve (5) in the damper chamber (4) is pretensioned by a spring element (30) into a closed position.

9. The method as in claim 8, wherein the spring element (30) presses a movable element or a movable plate (29) of the refill valve (5) in pretensioned condition from the inside against the damper film (3).

10. The method as in claim 9, wherein the control pressure of the control fluid necessary for opening the refill valve (5) is greater than the force of the spring element (30) necessary for closing the refill valve (5), divided by the surface area (A) of the damper film (3) directly limiting the damper chamber (4).

11. The method (1) as in claim 1, wherein the damper film (3) is in a plane condition when the refill valve (5) is closed.

12. The method (1) as in claim 1, wherein the damper film (3) is made of a material of a Shore hardness of 80A or more or a Shore hardness of 40D or more, or a Shore hardness of 85A or more or a Shore hardness of 45D or more, or a Shore hardness of 90A or more or a Shore hardness of 50D or more.

13. The method (1) as in claim 1, wherein the damper film (3) is made of one single layer.

14. The method (1) as in claim 1, wherein the damper film (3) has a thickness of 100 μm or less, or a thickness of 50 μm or less, or a thickness of 20 μm or less.

15. The method (1) as in claim 1, wherein the control chamber (36) has a disc-shaped cavity with a constant thickness.

16. The method (1) as in claim 1, wherein the control chamber (36) is completely empty and only filled with a fluid.

17. A method for operating and for cleaning an ink print head (DOD) or an ink-jet printer head (CIJ), equipped with:

an upstream pressure absorber (2), which comprises a closed damper chamber (4) that is at least partially limited by a plain damper film (3) made of a flexible material so that it reacts to a pressure difference (Δp) between both areas of the film with a curved deformation, a refill valve (5) arranged in the damper chamber (4) for refilling the damper chamber (4) with ink in a printing mode of operation as a response to a curved deformation of the damper film (3) into the damper chamber (4), wherein the damper film (3) is flexibly elastic, the method comprising the following steps:

providing:

a pressure sensor arranged on the pressure absorber (2) for detecting an opening of the refill valve (5) in the damper chamber (4), an external pressure source for generation of a pressure ($p_s$), wherein the external pressure source is adjustable and is able to generate an overpressure as well as a negative pressure, compared to an ambient air pressure, and a controllable device (6) arranged outside of the damper chamber (4) in such a way that an external pressure ($p_c$) is exerted on at least one area of the damper film (3) limiting the damper chamber (4), the controllable device (6) comprising a control chamber (36) having:

a housing (31) consisting of rigid, undeformable and pressure-resistant side walls;

one opening (37) with an area (A) which faces the area of the damper film (3) limiting the damper chamber (4) in such a way that the damper chamber (4) and the control chamber (36) lie directly opposite each other and are separated from each other only by the damper film (3), wherein the opening (37) in the control chamber (36) has a circular periphery, so that the damper film (3) can uniformly deflect over its entire surface without local overstressing of individual surface areas; and a connector arranged in one of the rigid, undeformable and pressure-resistant side walls of the housing (31) of the control chamber (36) for a pressure-tight connection of the control chamber (36) to the external pressure source with the pressure ($p_s$) to allow a control fluid to flow between the external pressure source and the control chamber (36) in order to achieve a pressure equalization between the pressure ($p_c$) in an entire cavity space of the control chamber (36) and the pressure ($p_s$) of the external pressure source;

generating, by an end user or by a control unit, an actual pre-defined set value for the external pressure source to generate, as the external pressure ($p_c$), either (i) an overpressure in order to open the refill valve (5) within the damper chamber (4) in a purging mode of operation, or (ii) a negative pressure, compared to the ambient air pressure, in order to assist in the implementation of a negative pressure in the ink contained in the damper chamber (4) in a printing mode of operation, adjusting or regulating the external pressure source to generate an overpressure or a negative pressure, compared to the ambient air pressure, depending on the actual pre-defined set value, further providing that, in the entire area (A) of the opening (37), the damper film (3) is only in contact with a movable part of the refill valve (5), so that an entire force (F) exerted by the control chamber (36) onto the damper film (3) is defined by the formula:

$$F=\Delta p*A=(p_c-p_d)*A=(p_s-p_d)*A,$$

where $p_d$ is the pressure in the damper chamber (4), transferring the resulting force (F) to the movable part of the refill valve (5) in order to:

(a) exert an adjustable pretensioning on the refill valve (5) in the printing mode of operation, or (b) open the refill valve (5) to create a continuously open channel through the pressure absorber for rinsing the ink print head or the ink-jet printer head in a purging mode of operation; and detecting, by use of the pressure sensor arranged on the pressure absorber (2), whether the refill valve (5) in the damper chamber (4) is open.

* * * * *